(12) United States Patent
Curzi et al.

(10) Patent No.: US 10,698,937 B2
(45) Date of Patent: Jun. 30, 2020

(54) SPLIT MAPPING FOR DYNAMIC RENDERING AND MAINTAINING CONSISTENCY OF DATA PROCESSED BY APPLICATIONS

(71) Applicant: MICROSOFT TECHNOLOGY LICENSING, LLC, Redmond, WA (US)

(72) Inventors: Alessandro Curzi, Dublin (IE); Tom Neckermann, Dublin (IE); Kyle Matthew Von Haden, Dublin (IE); Paul Barnes, Dublin (IE); Igor Ralic, Dublin (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/912,076

(22) Filed: Mar. 5, 2018

(65) Prior Publication Data

US 2019/0179958 A1 Jun. 13, 2019

Related U.S. Application Data

(60) Provisional application No. 62/598,459, filed on Dec. 13, 2017.

(51) Int. Cl.
*G06F 16/36* (2019.01)
*G06F 40/253* (2020.01)
(Continued)

(52) U.S. Cl.
CPC ............ *G06F 16/36* (2019.01); *G06F 3/0482* (2013.01); *G06F 3/0483* (2013.01);
(Continued)

(58) Field of Classification Search
CPC ...... G06F 16/36; G06F 17/212; G06F 17/278; G06F 17/2735
See application file for complete search history.

(56) References Cited

U.S. PATENT DOCUMENTS 5,287,278 A * 2/1994 Rau ..................... G06F 17/2745
704/1
5,787,451 A 7/1998 Mogilevsky
(Continued)

FOREIGN PATENT DOCUMENTS

| WO | 1997038376 A2 | 10/1997 | |
| WO | 0041095 A2 | 7/2000 | |
| WO | WO-2009041220 A1 * | 4/2009 | ......... G06F 17/2735 |

OTHER PUBLICATIONS

Pustejovsky, James, et al., "Extraction and Disambiguation of Acronym-Meaning Pairs in Medline," Medinfo, Oct. 2001, pp. 371-375. (Year: 2001).*
(Continued)

*Primary Examiner* — Richemond Dorvil
*Assistant Examiner* — Oluwadamilola M Ogunbiyi
(74) *Attorney, Agent, or Firm* — Newport IP, LLC; David W. Foster

(57) ABSTRACT

The present invention enables a system to efficiently maintain an ancillary pane containing a projection of document content, and content derived therefrom, while the underlying document is being edited. In one embodiment, an acronym pane displays a list of acronyms used in a document and one or more expansions of those acronyms. A data store containing maps is used to index which paragraphs contain which acronyms, and which acronyms are associated with which expansions. As sections of content are added, modified, or deleted, acronyms and expansions are added to and/or removed from the data store, causing the acronym pane to be updated.

20 Claims, 11 Drawing Sheets

(51) Int. Cl.

| | |
|---|---|
| *G06F 40/247* | (2020.01) |
| *G06F 40/242* | (2020.01) |
| *G06F 40/232* | (2020.01) |
| *G06F 40/134* | (2020.01) |
| *G06Q 10/10* | (2012.01) |
| *G06F 9/445* | (2018.01) |
| *G06F 9/451* | (2018.01) |
| *G06F 40/166* | (2020.01) |
| *G06F 16/31* | (2019.01) |
| *G06F 40/30* | (2020.01) |
| *G06F 40/106* | (2020.01) |
| *G06F 3/0482* | (2013.01) |
| *G06F 3/0483* | (2013.01) |
| *G06F 3/0484* | (2013.01) |
| *G06F 9/50* | (2006.01) |
| *G06F 9/54* | (2006.01) |
| *G06F 11/30* | (2006.01) |

(52) U.S. Cl.
CPC ...... *G06F 3/04842* (2013.01); *G06F 9/44526* (2013.01); *G06F 9/453* (2018.02); *G06F 9/5038* (2013.01); *G06F 9/541* (2013.01); *G06F 11/302* (2013.01); *G06F 16/31* (2019.01); *G06F 40/106* (2020.01); *G06F 40/134* (2020.01); *G06F 40/232* (2020.01); *G06F 40/242* (2020.01); *G06F 40/247* (2020.01); *G06F 40/253* (2020.01); *G06F 40/30* (2020.01); *G06Q 10/10* (2013.01); *G06F 40/166* (2020.01)

(56) References Cited

U.S. PATENT DOCUMENTS

| | | | |
|---|---|---|---|
| 6,199,081 | B1 | 3/2001 | Meyerzon et al. |
| 6,535,906 | B1 | 3/2003 | Barber et al. |
| 6,785,869 | B1 | 8/2004 | Berstis |
| 7,136,876 | B1 | 11/2006 | Adar et al. |
| 7,236,923 | B1 * | 6/2007 | Gupta .................. G06F 40/284 704/9 |
| 7,793,224 | B1 | 9/2010 | Ayers |
| 8,316,007 | B2 | 11/2012 | Liao |
| 8,667,487 | B1 | 3/2014 | Boodman et al. |
| 8,739,249 | B1 | 5/2014 | Kay et al. |
| 9,020,805 | B2 | 4/2015 | Boguraev et al. |
| 9,098,500 | B1 * | 8/2015 | Asokan ................ G06F 16/219 |
| 9,311,286 | B2 | 4/2016 | Bank et al. |
| 9,864,741 | B2 | 1/2018 | Mahmud et al. |
| 2002/0059251 | A1 | 5/2002 | Stern et al. |
| 2004/0205672 | A1 | 10/2004 | Bates et al. |
| 2005/0165778 | A1 | 7/2005 | Obata et al. |
| 2005/0240664 | A1 * | 10/2005 | Chen .................... H04L 41/082 709/220 |
| 2007/0016625 | A1 | 1/2007 | Berstis |
| 2007/0124375 | A1 | 5/2007 | Vasudevan et al. |
| 2007/0174045 | A1 * | 7/2007 | Kao .................... G06F 17/278 704/4 |
| 2008/0059539 | A1 | 3/2008 | Chin et al. |
| 2008/0086297 | A1 | 4/2008 | Li et al. |
| 2008/0159633 | A1 | 7/2008 | van Eikeren et al. |
| 2009/0313245 | A1 | 12/2009 | Weyl et al. |
| 2010/0318897 | A1 | 12/2010 | Wang |
| 2011/0047457 | A1 | 2/2011 | Flint et al. |
| 2011/0320408 | A1 | 12/2011 | Grosse et al. |
| 2011/0320459 | A1 * | 12/2011 | Chisholm ............. G06F 17/218 707/748 |
| 2012/0109974 | A1 * | 5/2012 | Feng .................. G06F 17/2247 707/748 |
| 2012/0278694 | A1 * | 11/2012 | Washio ............... G06F 17/2288 715/205 |
| 2012/0290950 | A1 * | 11/2012 | Rapaport ................ H04L 51/32 715/753 |
| 2013/0110500 | A1 | 5/2013 | Feng et al. |
| 2013/0191739 | A1 | 7/2013 | Bank et al. |
| 2014/0074860 | A1 * | 3/2014 | Medelyan ............. G06F 17/278 707/748 |
| 2014/0074886 | A1 * | 3/2014 | Medelyan ............... G06F 16/36 707/777 |
| 2015/0066480 | A1 | 3/2015 | Endo et al. |
| 2015/0088493 | A1 | 3/2015 | Thakore |
| 2015/0234809 | A1 | 8/2015 | Moore et al. |
| 2015/0309667 | A1 | 10/2015 | Wang |
| 2015/0317390 | A1 * | 11/2015 | Mills ...................... G06F 16/36 707/777 |
| 2016/0105386 | A1 | 4/2016 | Anders et al. |
| 2016/0283839 | A1 * | 9/2016 | Ye .......................... G06N 3/006 |
| 2017/0199963 | A1 * | 7/2017 | Kondadadi ........... G06F 19/328 |
| 2018/0196921 | A1 | 7/2018 | Devarakonda et al. |
| 2019/0179653 | A1 | 6/2019 | Von Haden et al. |
| 2019/0179680 | A1 | 6/2019 | Von Haden et al. |
| 2019/0179898 | A1 | 6/2019 | Jetley et al. |

OTHER PUBLICATIONS

Selvaretnam, Bhawani, and Mohammed Belkhatir, "A Linguistically Driven Framework for Query Expansion via Grammatically Constituent Highlighting and Role-Based Concept Weighting," Information Processing & Management, 52.2, pp. 174-192, 2016. (Year: 2016).*

"International Search Report & Written Opinion for PCT Patent Application No. PCT/US18/062387", dated Feb. 15, 2019, 11 Pages.

"International Search Report & Written Opinion for PCT Patent Application No. PCT/US18/062388", dated Feb. 15, 2019, 12 Pages.

"Non Final Office Action Issued in U.S. Appl. No. 15/923,962", dated Oct. 31, 2019, 16 Pages.

"Non Final Office Action Issued in U.S. Appl. No. 15/963,029", dated Nov. 18, 2019, 25 Pages.

Hoffman, Chris, "How to Install and Use Add-ins for Microsoft Office", Retrieved from: https://www.howtogeek.com/260569/how-to-install-and-use-add-ins-for-microsoft-office/, Jul. 5, 2016, 7 Pages.

"International Search Report and Written Opinion Issued in PCT Application No. PCT/US2018/062386", dated Feb. 12, 2019, 10 Pages.

"International Search Report and Written Opinion Issued in PCT Application No. PCT/US18/061894", dated Feb. 12, 2019, 10 Pages.

"Non-Final Office Action Issued in U.S. Appl. No. 15/951,086", dated Sep. 19, 2019, 18 Pages.

"Final Office Action Issued in U.S. Appl. No. 15/951,086", dated Apr. 20, 2020, 24 Pages.

"Final Office Action Issued in U.S. Appl. No. 15/963,029", dated Apr. 20, 2020, 10 Pages.

* cited by examiner

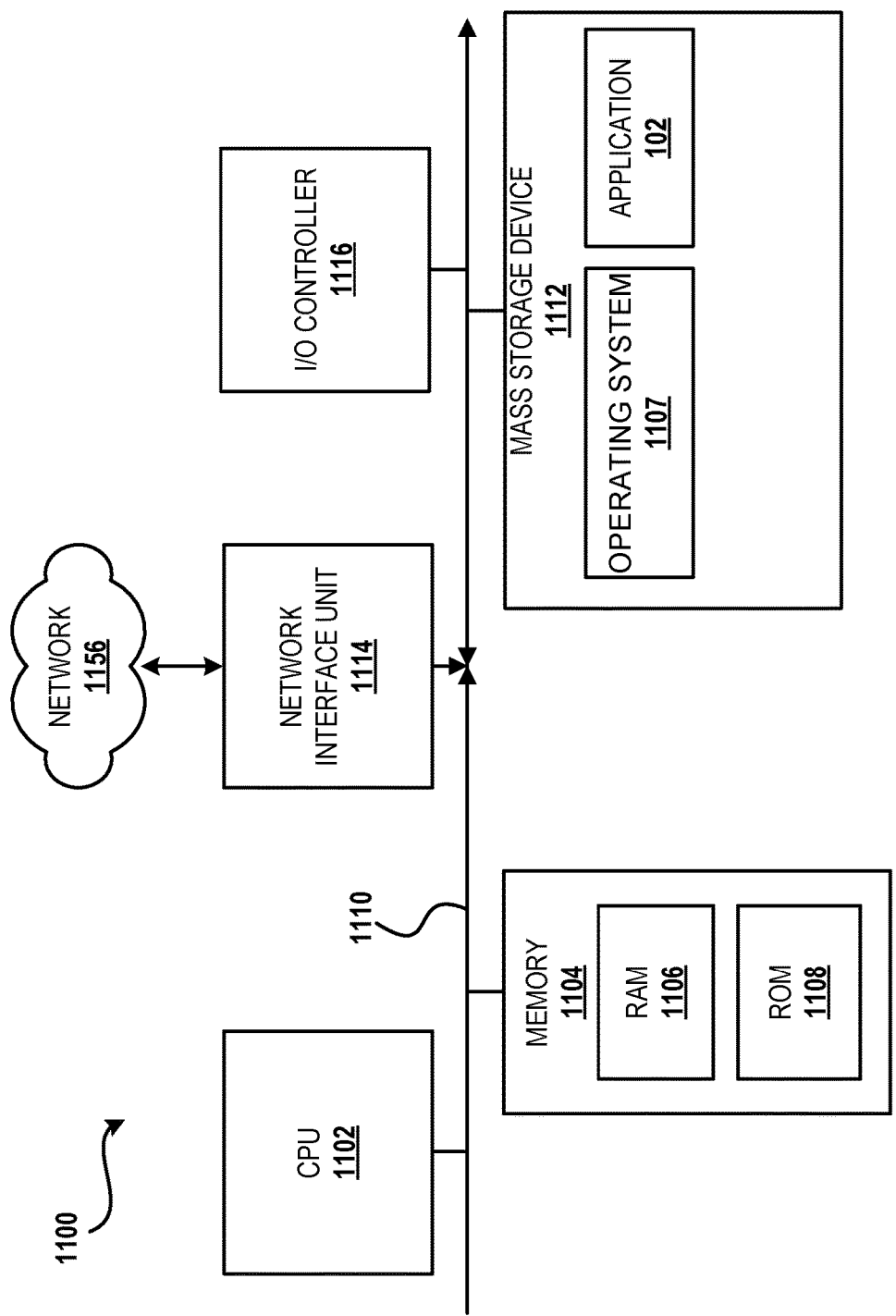

SPLIT MAPPING FOR DYNAMIC RENDERING AND MAINTAINING CONSISTENCY OF DATA PROCESSED BY APPLICATIONS

CROSS-REFERENCE TO RELATED APPLICATIONS

This application claims the benefit of U.S. provisional patent application No. 62/598,459, entitled "RESUMPTION OF ACTIVITIES USING ACTIVITY DATA COLLECTED BY AN OPERATING SYSTEM", which was filed on Dec. 13, 2017, and which is expressly incorporated herein by reference in its entirety.

BACKGROUND

Document-based productivity applications, such as word processors, presentation software, spreadsheet applications, web browsers, and the like typically display document content in an authoring pane. This authoring pane is often centered within the application, consuming a majority of the application's display space. However, document-based applications may also provide functionality in ancillary panes, which may be displayed adjacent to the main document content. Spellcheckers, style selectors, search boxes, and the like, may be presented in ancillary panes, enabling user interaction with the feature without occluding main document content.

Some ancillary panes display content derived from the main document pane. However, extracting and processing content for display in an ancillary pane may be computationally expensive, particularly for large documents, and when the underlying content is being added to, updated, and deleted frequently as a user edits the document, efficiently maintaining the content of the task pane has proved challenging.

In addition, some productivity applications don't display add-in output renderings efficiently. For example, a word processor may include add-ins for a spell checker. Providing displays of information in these add-ins, which can be in an ancillary pane, can be difficult since the content in the authoring pane may be incompatible with the content stored by the add-in and displayed in the ancillary pane.

SUMMARY

This invention addresses the shortcomings of some existing systems by providing software systems where add-ins manage data received from multiple sources, and store such data in at least two collections: one collection for dynamically updating the ancillary pane and the other collection for maintaining consistency between an authoring pane and the ancillary pane. These collections are synchronized as additional changes are received from the sources and as the user interacts with the authoring pane. The collections enable a more efficient display of plug-in data.

In one embodiment, an identifier (word, acronym, citation, name, etc.) is extracted from a document. Data related to the identifier (definitions, acronym expansions, citation details, contact information, etc.) is stored in the collections, along with the identifier. These two collections are maintained in sync as document content is changed. These updates coordinate the authoring pane and the ancillary pane, which ultimately improves user interaction with the computer, reduces inadvertent inputs, enhances user understanding of the document, and increases user satisfaction with the application. The updates also improve the performance speed in which an application can process, store, and display data.

One technological problem solved by the claimed embodiments is the challenge of processing large documents quickly. Many algorithms increase processing time linearly with an increase in document size. However, the claimed embodiments enable an ancillary pane to be updated correctly and completely as the underlying document changes, but in constant time. Efficiently updating an acronym pane reserves additional computing resources for other tasks, such as displaying an additional ancillary pane.

Another technological problem solved by the claimed embodiments is the difficulty in maintaining a separate display of portions of document content while edits are made to the underlying document, particularly when the portions of document content have been combined for representation by a single instance, augmented with additional information, or otherwise changed from how they appear in the underlying document. Naïve solutions, such as repeatedly scanning the document, consume significant amounts of processing resources and increase response time to user input.

In one embodiment, an application displays an authoring pane and an add-in of the application causes a display of an ancillary pane displaying a list of identifiers and data associated with the identifiers. The plug-in efficiently updates the ancillary pane as the document is edited. The plug-in maintains one data store that has two collections: one collection for mapping sections of the document to the identifiers, and another collection for mapping the identifiers to the related data, e.g., relating words to their definitions.

In one illustrative embodiment, an acronym pane displays a list of acronyms used in a document and one or more expansions of those acronyms. When the document contains multiple instances of an acronym, the acronym pane displays a single representative instance. However, acronyms can have multiple meanings (hereinafter "expansions"), such that the same acronym is used to mean different things throughout the document. In these scenarios, the acronym may be displayed once in the acronym pane along with the different expansions.

As such, edits to the document may introduce a first instance of an acronym or remove a final instance of an acronym, necessitating an update to the acronym pane. However, adding a subsequent instance, or removing one of many instances, does not add or remove the acronym from the acronym pane. Similarly, the system may also track when a first instance of an acronym having a particular expansion is added and when a last instance of the acronym having a particular expansion is removed, causing the corresponding expansion to be added or removed from the acronym pane.

For example, if the document contains the text "EDC" in three different sections, the acronym pane may display "EDC" once, along with an expansion, e.g. "European Development Center". However, if one of the instances is determined to refer to "Error Detection and Correction", both expansions will be displayed in the acronym pane.

In one embodiment, expansions do not necessarily appear in the document, but are identified by the acronym processing service based on the context (e.g. surrounding text, images, formatting) of the acronym. For example, the acronym processing service may determine that "EDC" stands for "Error Detection and Correction", even if "Error Detection and Correction" does not appear in the document. In one embodiment, the acronym processing service makes this determination based on a glossary of terms extracted from a collection of documents related to the user and stored in a remote data store, the remote data store can include any resource, including word processing documents, emails, calendar appointments, slide decks, and the like. The remote data store can also include a remote computing device that scans through any type of document, file, or database too extract data such as contact information, definitions, citation details, acronym expansions, or other data related to an identifier. In addition, expansions may also be determined from a dictionary or extracted from files or a document.

While acronyms and expansions are discussed throughout this disclosure, they are but one example of identifiers that may be extracted from a document, augmented with related data, and kept in sync as the document is edited. The techniques disclosed herein apply to any type of identifier, such as a name, word, acronym, citation, etc., or any other type of content. In addition, the techniques disclosed herein can apply to any type of data related to the identifier, such as a definition, acronym expansion, citation details, etc. Similarly, sections of content may include paragraphs, slide deck text boxes, spreadsheet cells, database rows, or any other source of content. By breaking a larger document into sections of content, analysis can be limited to that section of content, avoiding re-processing the entire document.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 7 shows diagrams of data types used to store acronyms, expansions, and the sections of content they are associated with.

FIG. 11 is a computer architecture diagram illustrating an illustrative computer hardware and software architecture for a computing system capable of implementing aspects of the techniques and technologies presented herein.

DETAILED DESCRIPTION

As used herein, "acronym" refers to a series of letters, often capitalized, that refer to a series of words that often begin with letters of the acronym. For example, "ECD" is an acronym, as it may refer to "European Development Center", "AI+R" may refer to Artificial Intelligence and Research, and "NLX" may refer to "Natural Language eXperiences".

As used herein, "expansion" refers to a series of words associated with the letters of an acronym. For example, "European Development Center" is on expansion for the acronym "EDC". Acronyms may have multiple expansions, e.g. "Error Detection and Correction" and "European Development Center".

As used herein, "object" refers to an abstraction commonly used in computer programming to group related pieces of data and methods that operate on that data. Objects may be associated with a class type, such as "ParagraphAcornym".

As used herein, "section", as in a "section of content", refers to a section of a file can be any definitive unit of data, such as a page, side, tab, worksheet, column, row, video segment, audio segment, etc. In addition, a section of a file can be defined by text or data having a particular format, such as an annotation, a header, a footer, a footnote, column header, row header, etc.

Figure 1:
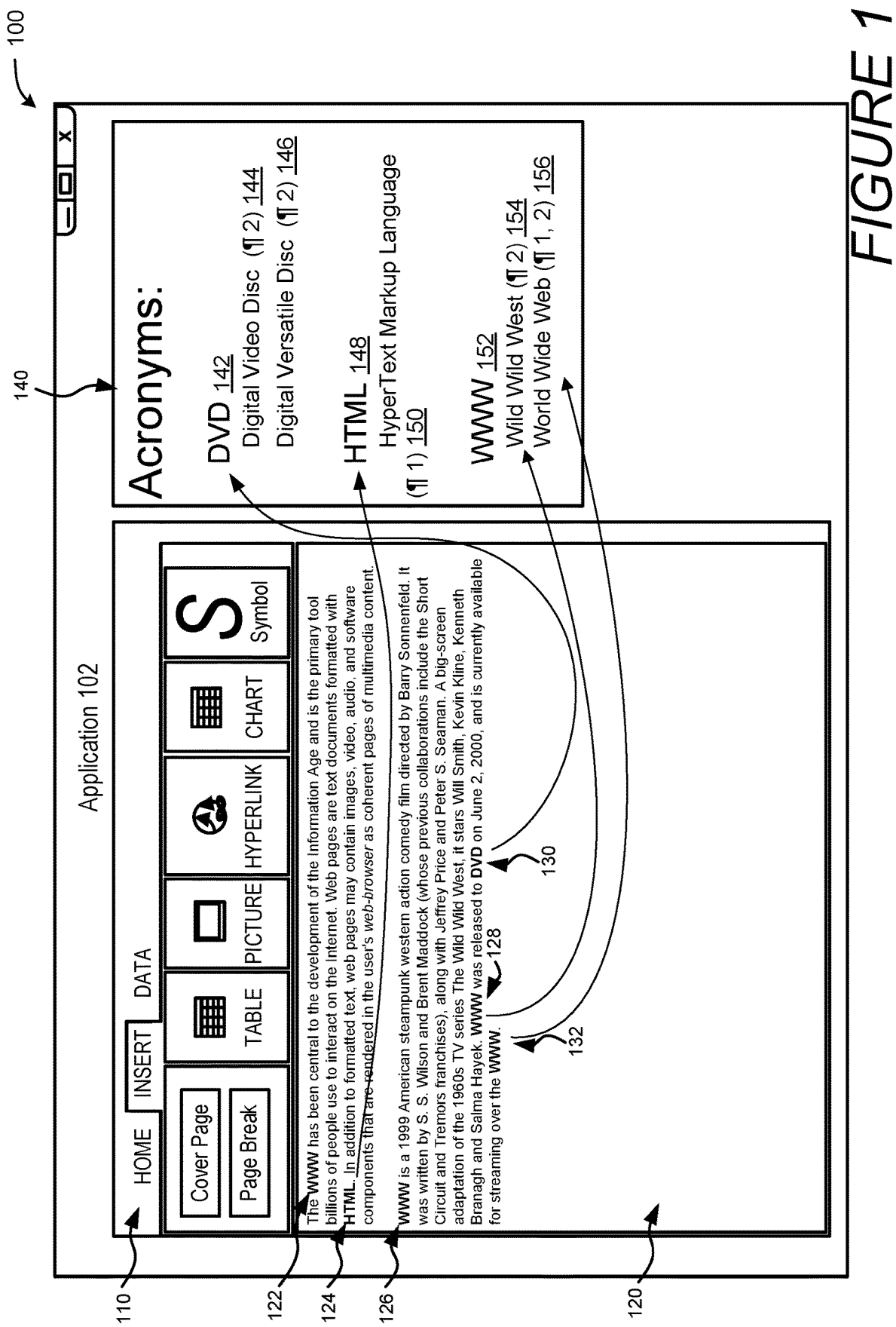
FIG. 1 shows a document-based application including an acronym pane displaying acronyms that have been extracted from the document.

FIG. 1 shows a document-based application 100 including an acronym pane displaying acronyms that have been extracted from the document. In one embodiment, application 100 executes on computing device 102, and includes a document-based application including a menu 110, a document authoring pane 120, and an acronyms pane 140.

Document authoring pane 120 includes text-based content divided into two sections. The content includes a number of acronyms, including WWW 122, HTML 124, WWW 126, WWW 128, DVD 130, and WWW 132. While there are multiple instances of the acronym WWW, not all instances are associated with the same expansion, as discussed below.

Acronym pane 140 lists three acronyms found in the document: DVD 142, HTML 148, and WWW 152, with arrows associating the acronyms with one or more instances of the acronyms contained in the document.

Each acronym in pane 140 includes one or more expansions. For example, DVD 142, found in the $2^{nd}$ section, may be expanded as "Digital Video Disc" 144 or Digital Versatile Disc" 146. Similarly, HTML 148, located in the $1^{st}$ section, is associated with the expansion "HyperText Markup Language" 150. WWW 152 is associated with the expansion "Wild Wild West" 154, found in the $2^{nd}$ section, and "World Wide Web" 156, found in the $1^{st}$ and $2^{nd}$ sections.

In the case of WWW 152, which expansion is associated with which paragraph is determined based on contextual data. For example, in the $1^{st}$ section, WWW 122 is discussed in the context of the information age and the Internet, and so the expansion "World Wide Web" is associated with it. On the other hand, in the $2^{nd}$ section, WWW 126 is discussed in the context of a 1999 American steam punk western action comedy film, and as such is associated with the expansion "Wild Wild West" 154.

Figure 2:
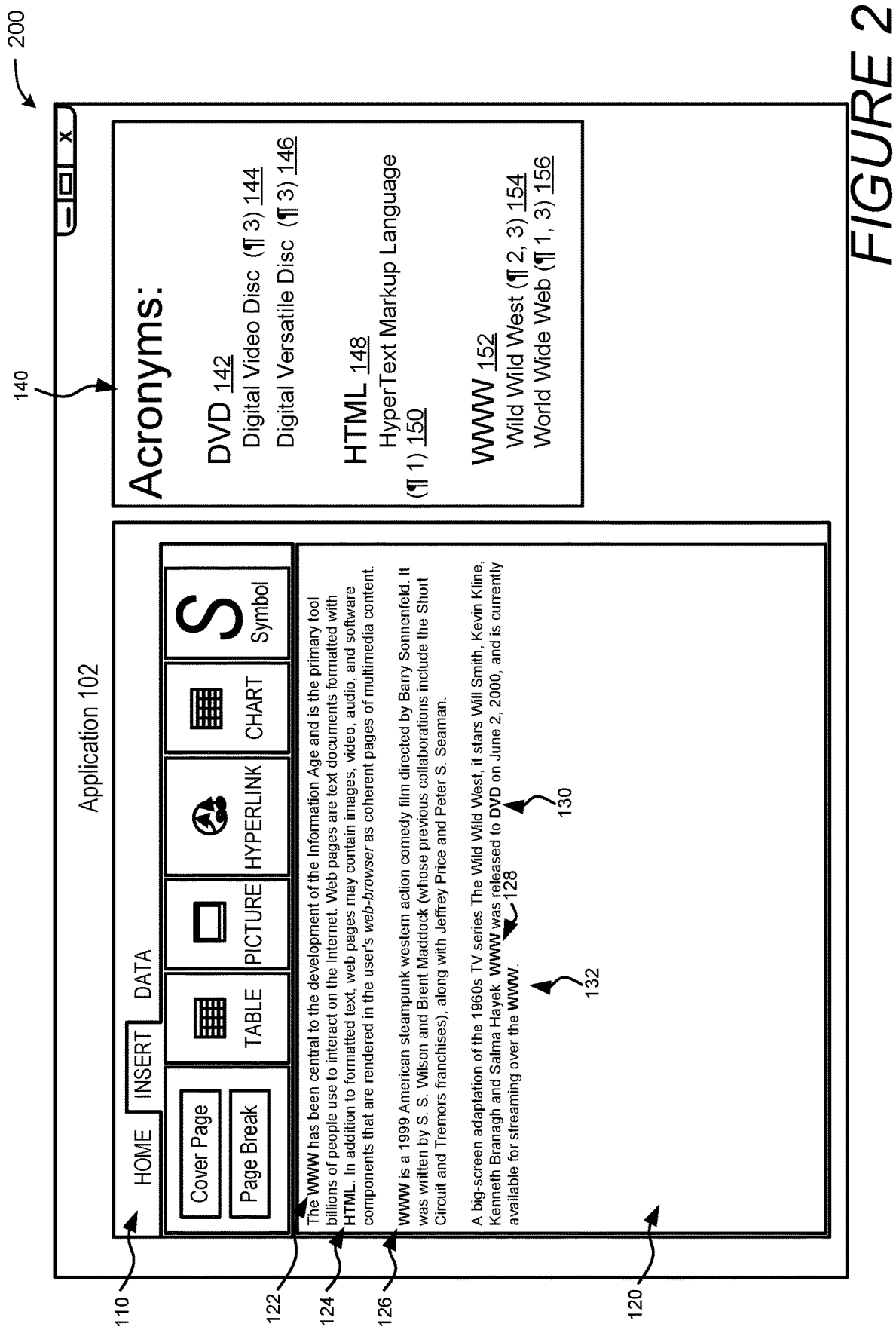
FIG. 2 shows a document-based application including an acronym pane displaying acronyms that have been extracted from the document, in which an existing section has been divided into two sections.

FIG. 2 shows a document-based application 200 including an acronym pane 140 displaying acronyms 142, 148, and 152 that have been extracted from the document, in which an existing section of content has been divided into two sections of content. Specifically, the $2^{nd}$ section of content has been split in two, creating a $3^{rd}$ section of content and causing an update to the $2^{nd}$ section.

Updating a section of content is described below in conjunction with FIG. 9. Briefly, however, in one embodiment, the update to the $2^{nd}$ section is processed by identifying acronyms included in the $2^{nd}$ section after the split, and inserting them into the data store as described below in conjunction with FIG. 8. In one embodiment, the contents of the $2^{nd}$ section are transmitted to an acronym processing service, which returns a list of ParagraphAcronym objects, one ParagraphAcronym for each acronym found. Each ParagraphAcronym object may include a ParagraphID, the identified Acronym, and a list of one or more Expansions objects. In one embodiment, before the acronym processing service is invoked, the second section is screened for potential acronyms, omitting a call to the acronym processing service if no potential acronyms are found.

In one embodiment, each of the returned ParagraphAcronym objects is inserted into the data store as if it were a newly added paragraph. However, some acronyms that were part of the $2^{nd}$ section may now, as a result of the split, be part of the $3^{rd}$ section, requiring an update to the data store. To accomplish this, in addition to inserting acronyms, each acronym and expansion that is added to the data store, or that would have been added to the data store if it didn't exist already, is tagged. Then, all untagged expansions and acronyms are removed from the data store as described below in conjunction with FIG. 9. In this way, not only are acronyms that remain in the $2^{nd}$ section represented as such in the data store, acronyms that have been removed from a section to are no longer represented as such in the data store.

In one embodiment, splitting the $2^{nd}$ section in two has the effect of creating a $3^{rd}$ section, which is added as discussed below in conjunction with FIG. 8. Briefly, however, in one embodiment, the $3^{rd}$ section is provided to the acronym processing service, which returns a list of ParagraphAcronym objects, each containing a ParagraphID, a Name of an identified acronym (e.g. "EDM"), and one or more Expansions objects, each of which contains name of the acronym, a description of the acronym, a source type (email, file, etc.), a score, and lists of related emails, related files, related people, and related expansions, as discussed above.

Data from each ParagraphAcronym object is inserted into the data store. In one embodiment, the data store iterates through the ParagraphAcronym and checks to see if the acronym exists in a mapping of Acronyms to AcronymExpansions objects, where each AcronymExpansions object includes the Acronym, an Expansions mapping of expansions to ExpansionWrapper objects, and a SourceParagraph mapping of ParagraphIDs to lists of Expansions. Each ExpansionWrapper object includes an Expansion object as discussed above and a SourceParagraphs set of ParagraphIDs that the Expansion object is associated with. Specifically, the SourceParagraphs set of ParagraphIDs indicates which paragraphs contain an acronym of this ExpansionWrapper object's Expansion.

In one embodiment, if the acronym does not exist in the data store's Acronyms mapping of Acronyms to AcronymExpansions objects, an AcronymExpansions object is created, and a (Acronym, AcronymExpansions object) pair is added to the Acronyms mapping.

Then, the data store iterates through Expansion objects included in the ParagraphAcronym. The data store uses the Acronyms mapping to look up the AcronymExpansions object associated with the returned acronym (e.g. "EDC"), and determines if there is already an entry for this expansion (e.g. "Error Detection and Correction") in the Expansions mapping of Expansions to ExpansionWrapper objects. If not, a new ExpansionWrapper object is created, with a reference to the Expansion object, and inserted into the Expansions mapping. Next, the ParagraphID is added to the SourceParagraphs mapping of the generated AcronymExpansions object.

However, if the acronym does exist in the data stores' Acronyms mapping, that means this acronym already exists in the document, and a new AcronymExpansions object does not need to be generated. However, now that the acronym is associated with a new section of content, the ParagraphID is added to the existing AcronymExpansions' SourceParagraph mapping, indicating that this section also includes the acronym.

Similarly, whether an ExpansionWrapper object was created, or if it already existed (indicating that a section of content—possibly a different section or possibly the same section—already has an instance of the identified acronym having the identified expansion), the identified section is added to the ExpansionWrapper object's SourceParagraphs set.

Once the data store has been updated, task pane 140 may be updated by traversing the updated Acronyms mapping of Acronyms to AcronymExpansion objects. FIG. 2 depicts this change in that acronym expansions 144, 146, and 156 are now associated with the $3^{rd}$ section instead of the $2^{nd}$ section, while the expansion "Wild Wild West" 154 is included in the $2^{nd}$ and $3^{rd}$ sections.

Figure 3:
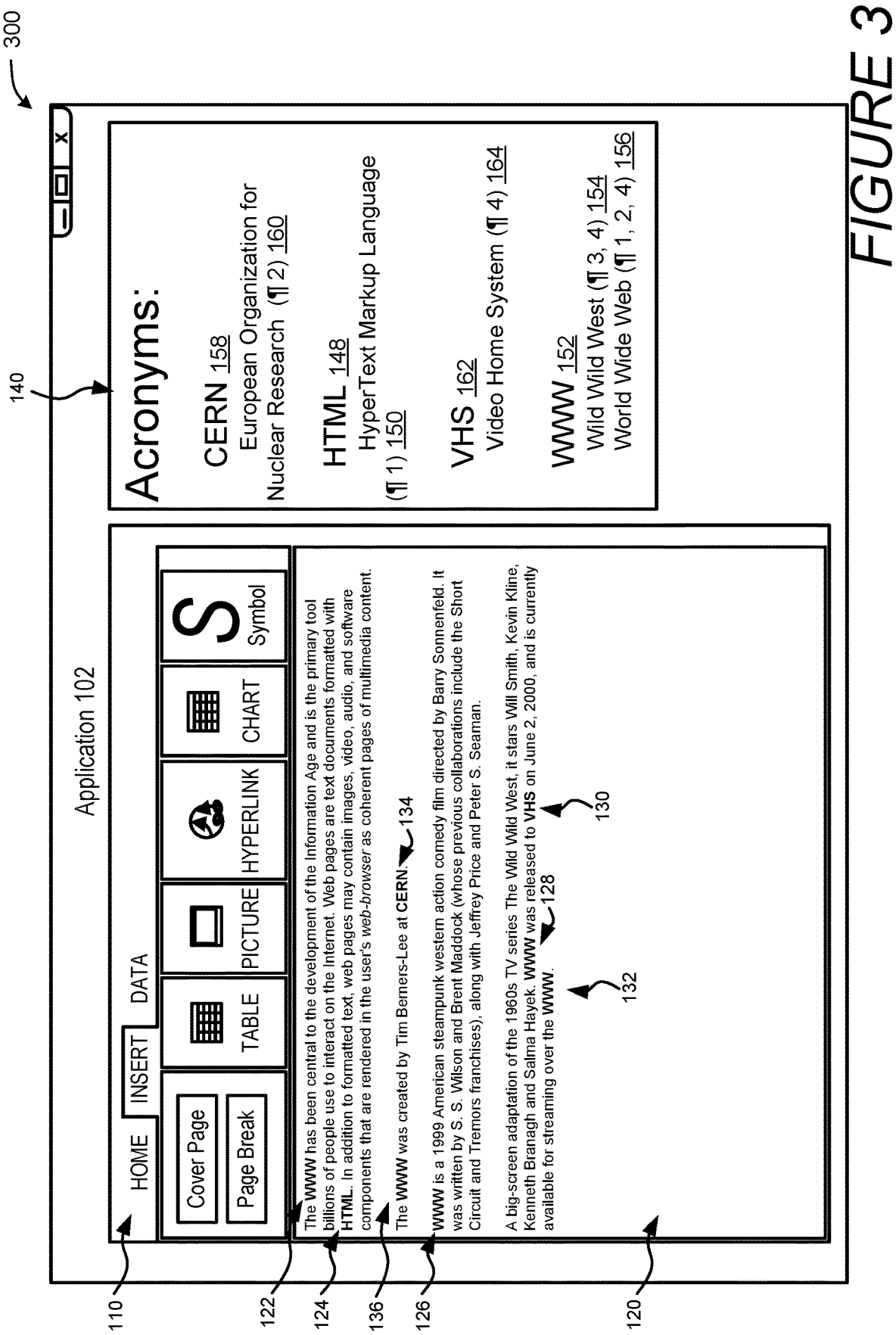
FIG. 3 shows a document-based application including an acronym pane displaying acronyms that have been extracted from the document in which a new section has been added and an existing section has been modified.

FIG. 3 shows a document-based application 300 including an acronym pane 140 displaying acronyms 158, 148, 162, and 152 that have been extracted from the document in which a new section has been added and an existing section has been modified. In this embodiment, a new section has been added between the $1^{st}$ and $2^{nd}$ section, while the last section, now the $4^{th}$ section, has been modified, replacing the acronym DVD with VHS. In one embodiment, ParagraphIDs are globally unique identifiers (GUIDs), and so adding a section does not affect the order or content of existing sections.

In one embodiment, the $2^{nd}$ section is inserted into the data set as described below in conjunction with FIG. 8, adding another section in which the "World Wide Web" expansion of the acronym WWW 152 is located. Also, new acronym CERN 158, with expansion "European Organization for Nuclear Research" 160 is added.

The update to what is now the $4^{th}$ section has the effect of removing the DVD acronym 142 while adding the acronym VHS 162 and corresponding expansion "Video Home System" 164.

Figure 4:
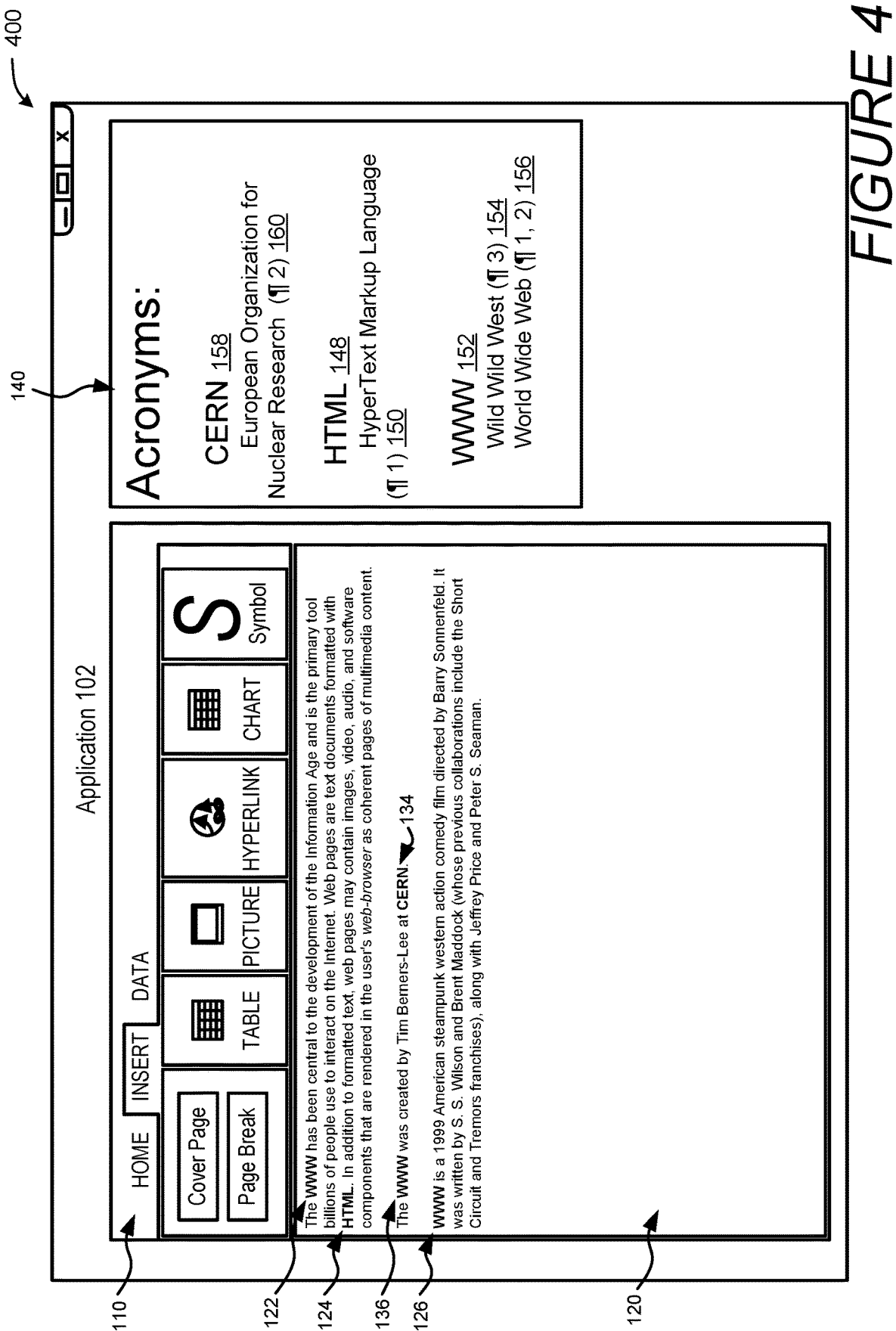
FIG. 4 shows a document-based application including an acronym pane displaying acronyms that have been extracted from the document in which a section has been removed from the document.

FIG. 4 shows a document-based application 400 including an acronym pane 140 displaying acronyms 158, 148, and 152 that have been extracted from the document, where a section has been removed from the document.

In this depiction, the 3$^{rd}$ and 4$^{th}$ sections have been removed, causing some but not all of the instances of the "World Wide Web" expansion 156 of the WWW acronym 152 to be removed. Moreover, all instances of the "Wild Wild West" expansion 154 of WWW acronym 152 have been removed, causing the corresponding entry in the acronym pane 140 to be removed.

Figure 5:
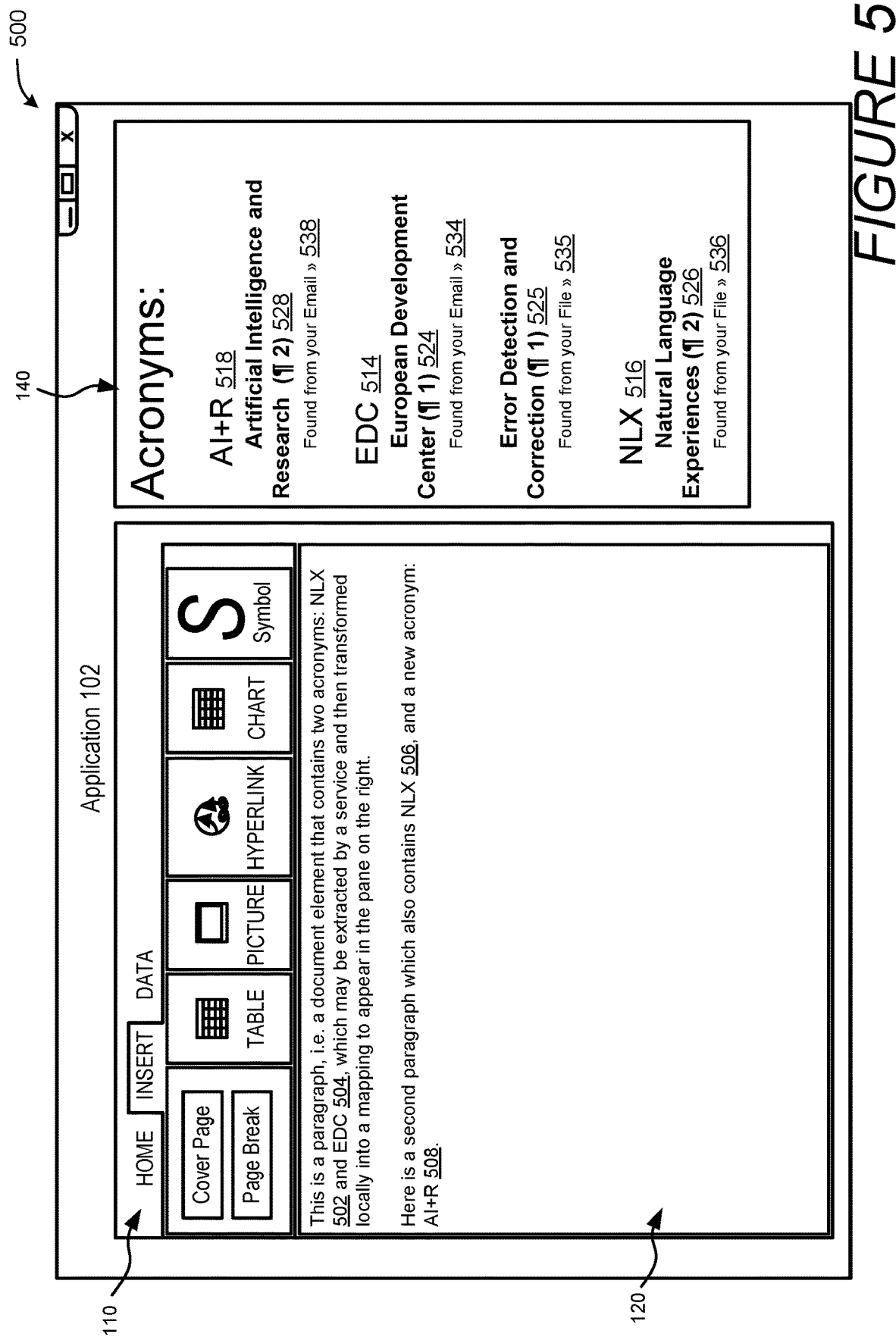
FIG. 5 shows a document-based application including an acronym pane displaying acronyms that have been extracted from the document, including references to where the particular acronym expansion was identified.

FIG. 5 shows a document-based application 500 including an acronym pane 140 displaying acronyms AI+R 518, EDC 514, and NLX 516 that have been extracted from the document, including references 538, 534, 535, and 536 to where the particular acronym expansion was identified.

This embodiment depicts 2 sections, the first including acronyms NLX 502 and EDC 504, the second including acronyms NLX 506 and AI+R 508. Acronyms pane 140 depicts the three acronyms 518, 514, and 516. These acronyms are depicted in alphabetical order, but other orders are similarly contemplated, including the order in which acronyms appear in the document, an order that prioritizes frequently encountered acronyms, an order that prioritizes acronyms associated with multiple expansions, and the like. In another embodiment, acronym pane 140 may display acronyms currently visible in document authoring pane 120.

The acronym AI+R 518 is associated with one expansion, "Artificial Intelligence and Research" 528, which is associated with an indication 538 that this expansion was found in the user's email 538. Indication 538 includes an arrow that when clicked displays at least a portion of the email containing the acronym's expansion.

The acronym EDC 514 is associated with two expansions, "European Development Center" 524, and "Error Detection and Correction" 525. Expansion 524 is associated with indication 534 that expansion "European Development Center" 524 was found in the user's email, while expansion 525 is associated with indication 535 that "Error Detection and Correction" 525 was found in one of the user's files. In one embodiment, a user is able to click on indication 534 to view at least a portion of the user's email containing expansion 524, while a user is enabled to click on indication 535 to view at least a portion of the document containing expansion 525.

The acronym NLX 516 is associated with one expansion, "Natural Language Experiences" 526, which is associated with an indication 536 that this expansion was found in one of the user's files. Clicking on indication 536 may similarly display at least a portion of the file expansion 526 was found in.

Figure 6:
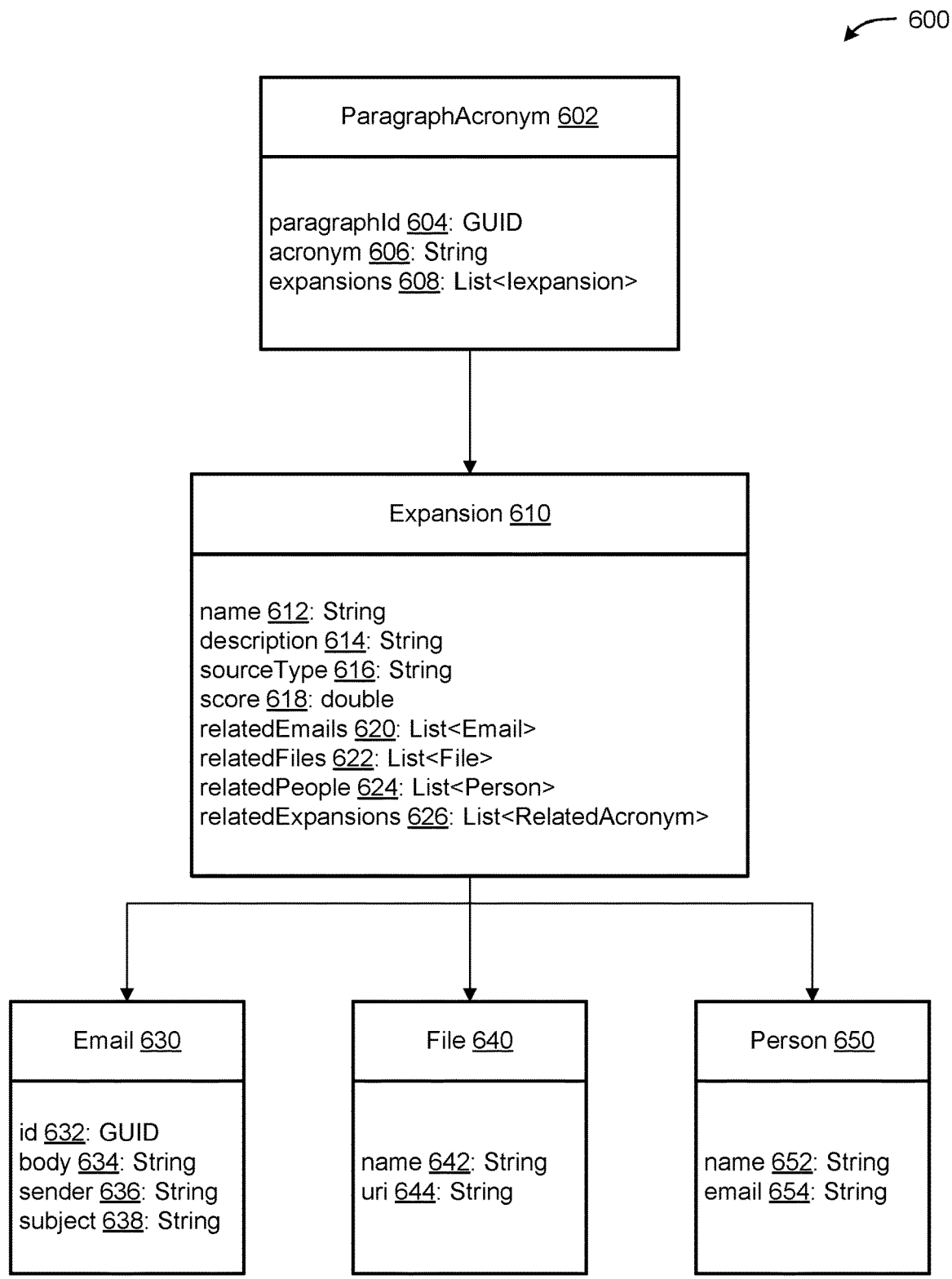
FIG. 6 shows diagrams of data types returned by an acronym processing service.

FIG. 6 shows diagrams 600 of data types returned by an acronym processing service. In one embodiment, ParagraphAcronym 602 includes ParagraphID 604, a GUID, Acronym 606, a string of text (string), and Expansions 608, a list of Expansions 610. In one embodiment, ParagraphID 604 indicates which paragraph Acronym 606 was identified in, while each Expansion object of Expansions 608 represents a potential expansion of Acronym 606. For example, if a section of content including the acronym "DVD" 142 was provided to the acronym processing service, an ParagraphAcronym 602 received in response may include an Expansion representing "Digital Video Disc" 144 and an Expansion representing "Digital Versatile Disc" 146.

In one embodiment, Expansion 610 includes Name 612, Description 614, and SourceType 616. Name 612 includes the text of the expansion, e.g. "Digital Video Disc", while SourceType 616 describes the type of document the expansion was defined in (e.g. "email", "file", "calendar entry", etc.). Expansion 610 also includes Score 618, a floating point number ('double'), which in one embodiment indicates a confidence in the acronym correctly being mapped to this expansion. RelatedEmails 620 and RelatedFiles 622 are lists of objects that further define where the acronym expansion was found, including but not limited to a citation to or a portion of the email/document where the acronym expansion was found. RelatedEmails 620 comprises a list of Email 630 objects, each of which includes an ID 632, a Body 634, a Sender 636, and a Subject 638. RelatedFiles 622 comprises a list of File objects, each of which includes Name 642 and UniversalResourceIndicator (URI) 644. RelatedPeople 624 includes a list of Person 650 objects, each of which includes a Name 652 and an EmailAddress 654 indicating an author of a document that defines the Expansion. RelatedExpansion 626 includes a list of RelatedAcronym objects, each of which refers to another Expansion 610 object of same acronym.

Figure 7:
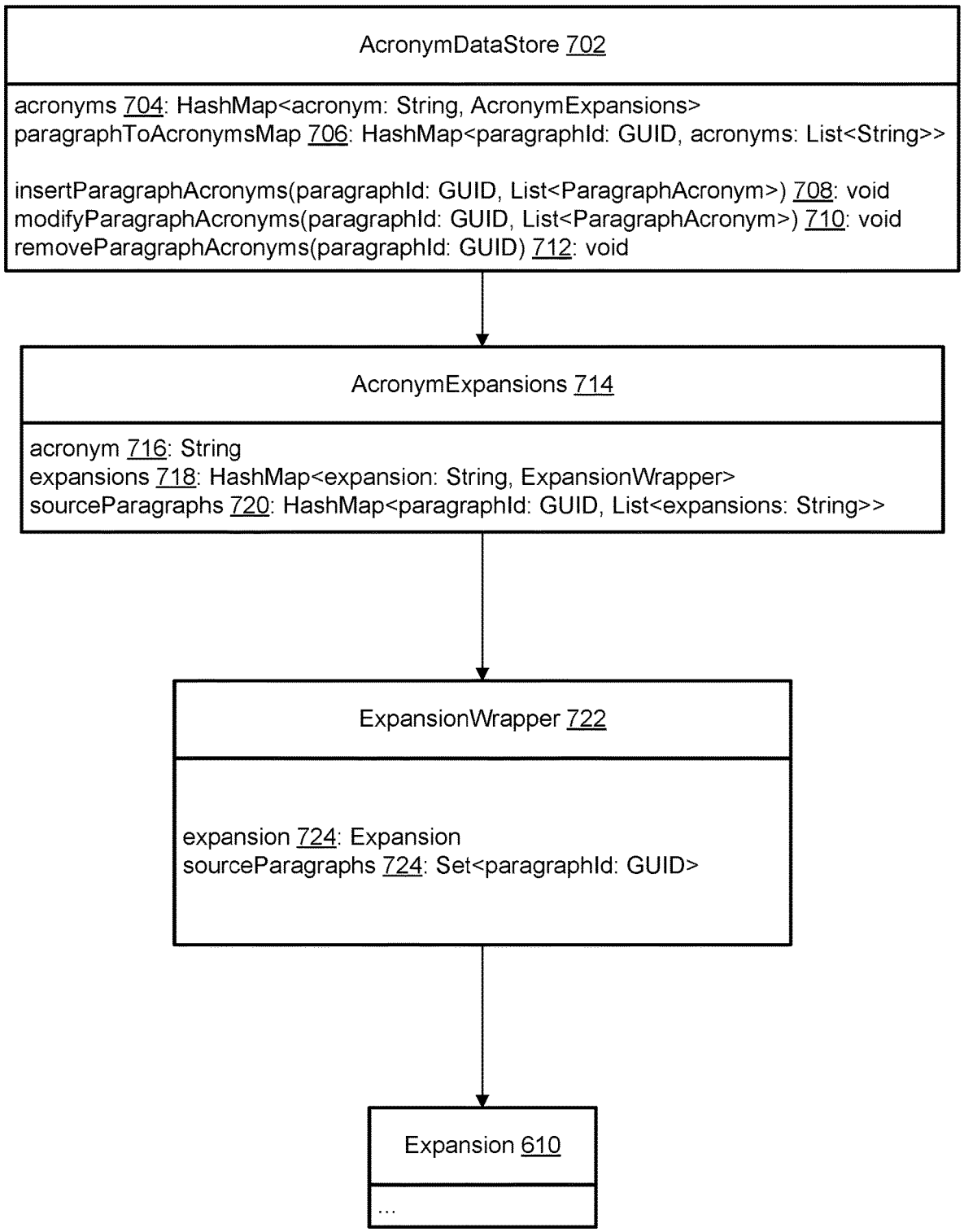

FIG. 7 shows diagrams 700 of data types used to store acronyms, expansions, and the sections of content they are associated with. In one embodiment, AcronymDataStore 702 includes Acronyms 704, a map of acronyms to AcronymExpansions objects, and ParagraphToAcronymsMap 706, a map of ParagraphIDs to a list of acronyms.

AcronymDataStore 702 also includes an InsertParagraphAcronyms 708 method which takes a ParagraphID and a list of ParagraphAcronym objects as parameters. The implementation of this function is described below in conjunction with FIG. 8. AcronymDataStore 702 also includes a ModifyParagraphAcronyms 710 method which also takes a ParagraphID and a list of ParagraphAcronyms as parameters, and which is described below in conjunction with FIG. 10. AcronymDataStore 702 also includes a RemoveParagraphAcronyms 712 method takes a ParagraphID as the sole parameter, and which is described below in conjunction with FIG. 9.

Acronyms 704 contains a map of Acronyms (e.g. "EDC") to AcronymExpansions 714 objects. In one embodiment, AcronymExpansions 714 objects contain Acronym 716, a string (e.g. "EDC"), Expansions 718, a map of expansions to ExpansionWrapper objects, and SourceParagraphs 720, a map of ParagraphIDs to lists of expansions. In one embodiment, SourceParagraphs 720 tracks which paragraphs contain which expansions of acronym 716. At the same time, Expansions 718 enables looking up an ExpansionWrapper object given the text of an expansion (e.g. "European Development Center").

In one embodiment, ExpansionWrapper 722 includes expansion 724, a reference to an Expansion 610 object discussed above in conjunction with FIG. 6, and a SourceParagraphs 724 set, which indicates which sections of content Expansion 724 is associated with (i.e. which sections contain an acronym having the expansion represented by Expansion 724).

Figure 8:
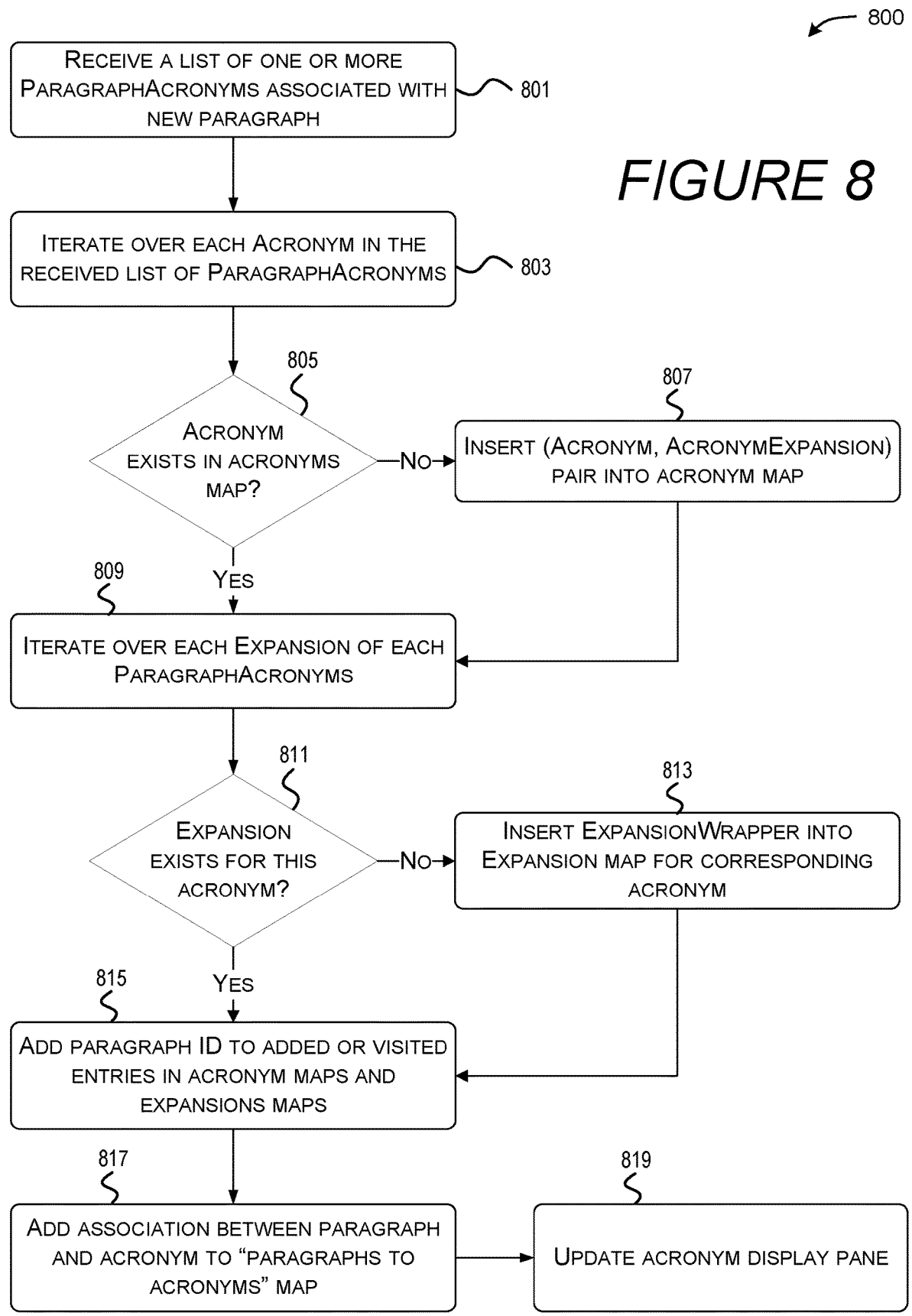
FIG. 8 is a flow diagram showing aspects of a routine for updating a task pane displaying acronyms in response to a newly added section of content.

FIG. 8 is a flow diagram showing aspects of a routine 800 for updating a task pane displaying acronyms in response to a newly added section of content. Routine 800 may be implemented by the InsertParagraphAcronyms function 708 of AcronymDataStore 702.

Routine 800 begins at operation 801, where a list of one or more ParagraphAcronym objects associated with a newly added section of content are received. In one embodiment, a ParagraphID associated with the newly added section of content is also received.

At operation 803, each acronym in the received list of ParagraphAcronyms is iterated over. In one embodiment, multiple ParagraphAcronyms are received from an acronym processing service when a section of content contains multiple acronyms, or when multiple sections of content contain acronyms.

At operation 805, a determination is made whether an acronym exists in the Acronyms map 704. In one embodiment, Acronyms map 704 includes a HashMap, and determining whether the acronym exists in the HashMap includes determining if the HashMap includes the acronym as a key. If the acronym does not exist in the Acronyms map 704, the routine proceeds to operation 807, where an AcronymExpansions object is generated from the ParagraphAcronym, and a (Acronym, AcronymExpansions object) pair is added to the Acronyms map 704.

At operation 809, each expansion of each ParagraphAcronym is iterated over. In one embodiment, ParagraphAcornym 602 includes a list of Expansions 608, and so iterating each expansion includes iterating over each list of Expansions 608 for each received ParagraphAcronym 602.

At operation 811, a determination is made whether an expansion already exists for this acronym in the data store. In one embodiment, this determination is made by querying Acronyms 704 of AcronymDataStore 702 for all AcronymExpansion objects 714 associated the acronym. Once AcronymExpansion objects 714 are identified, the Expansions 718 map of each is queried to determine if an ExpansionWrapper 722 for the expansion in question already exists. If a corresponding ExpansionWrapper 722 does not exist, the routine proceeds to operation 811, where a new ExpansionWrapper is created and inserted into the Expansions map 718.

At operation 815, a ParagraphID is added to the SourceParagraphs objects of each AcronymExpansion object and each ExpansionWrapper object inserted during operations 807 and 813. At the same time, when an AcronymExpansion or an ExpansionWrapper object would have been inserted, but the object already existed (because this acronym and/or expansion was already associated with a section of content), the ParagraphID is added to the SourceParagraphs mapping 720 of these "would have been added" AcronymExpansion objects and the SourceParagraphs set 724 of these "would have been added" ExpansionWrapper objects 722. In this way, operation 815 enables tracking which sections of content contain which expansions of which acronyms.

At operation 817, an entry into the ParagraphToAcronymsMap 706 is added for the section of content and the acronym name received from the acronym processing service. In this way, AcronymDataStore 702 may use Acronyms map 704 to list all acronyms and expansions identified in the document, while ParagraphToAcronymsMap 706 represents which acronyms appear in which sections of content in the document.

At operation 819, acronym display pane 140 is updated based on changes to the acronyms map 704.

Figure 9:
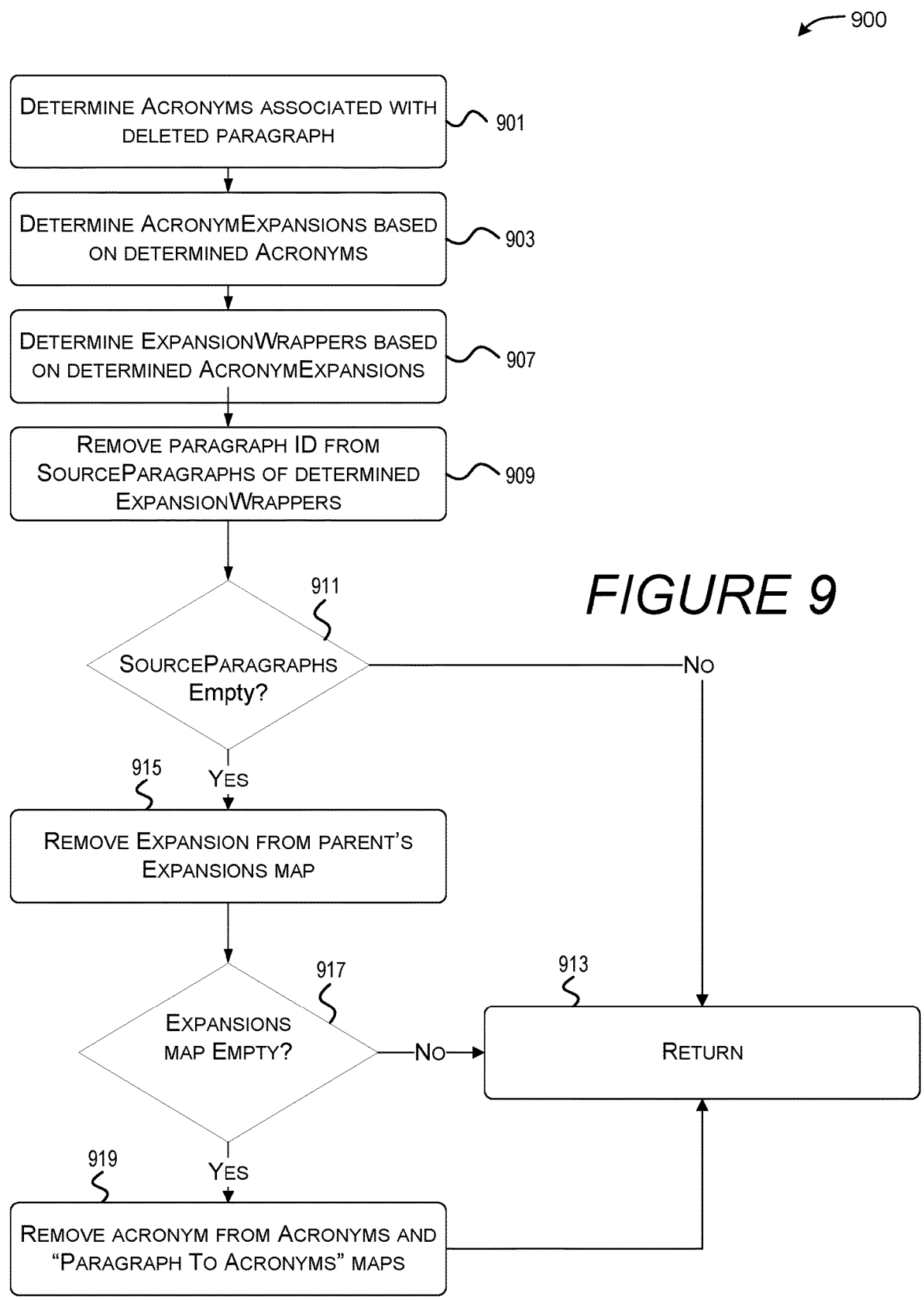
FIG. 9 is a flow diagram showing aspects of a routine for updating a task pane displaying acronyms in response to a deleted section of content.

FIG. 9 is a flow diagram showing aspects of a routine 900 for updating a task pane displaying acronyms in response to a deleted section of content. Routine 900 may be implemented, in one embodiment, by the RemoveParagraphAcronyns function 712 of AcronymDataStore 702.

Flow diagram 900 begins at operation 901, where in one embodiment ParagraphToAcronymsMap 706 is utilized to determine a list of acronyms associated with the deleted section of content.

At operation 903, for each acronym associated with the deleted section of content, as determined in operation 901, one or more AcronymExpansion objects 714 are determined.

At operation 907, for each of the one or more AcronymExpansion objects 714 determined in operation 903, one or more ExpansionWrapper objects 722 are determined. In one embodiment, the SourceParagraphs map 720 is used to identify a list of expansions associated with the deleted section of content. Then, Expansions map 718 is used to map the identified expansions to associated ExpansionWrapper objects 722.

At operation 909, the ParagraphID of the deleted section of content is removed from the SourceParagraphs set 724 of each determined ExpansionWrapper object 722.

At operation 911 a determination is made whether a SourceParagraphs set 724 is empty after removing the ParagraphID of the deleted section of content. If not, meaning there are other sections of content that contain an acronym having this expansion, routine 900 proceeds to a return block 913.

However, if a sourceParagraphs set 724 becomes empty after removing the ParagraphID of the section of content, the routine proceeds to operation 915, where the ExpansionWrapper object 722 that contains the SourceParagraphs set 724 is removed from the parent AcronymExpansions 714's Expansions map 718. This removal indicates that all sections of content containing acronyms having this expansion have been removed from the document.

At operation 917, a determination is made whether, as a result of removing the ExpansionWrapper object 722 from the Expansions map 718, the Expansions map 718 is now empty, indicating that this acronym is no longer contained in any section of content. If it's not, meaning there are sections of content that contain this acronym, routine 900 proceeds to return block 913.

However, if the Expansions map 718 is empty, the routine proceeds to operation 919, where the acronym is removed from the AcronymDataStore 702's Acronyms map 704 and ParagraphToAcronymsMap 706, signifying that all instances of the acronym have been removed from the document.

Figure 10:
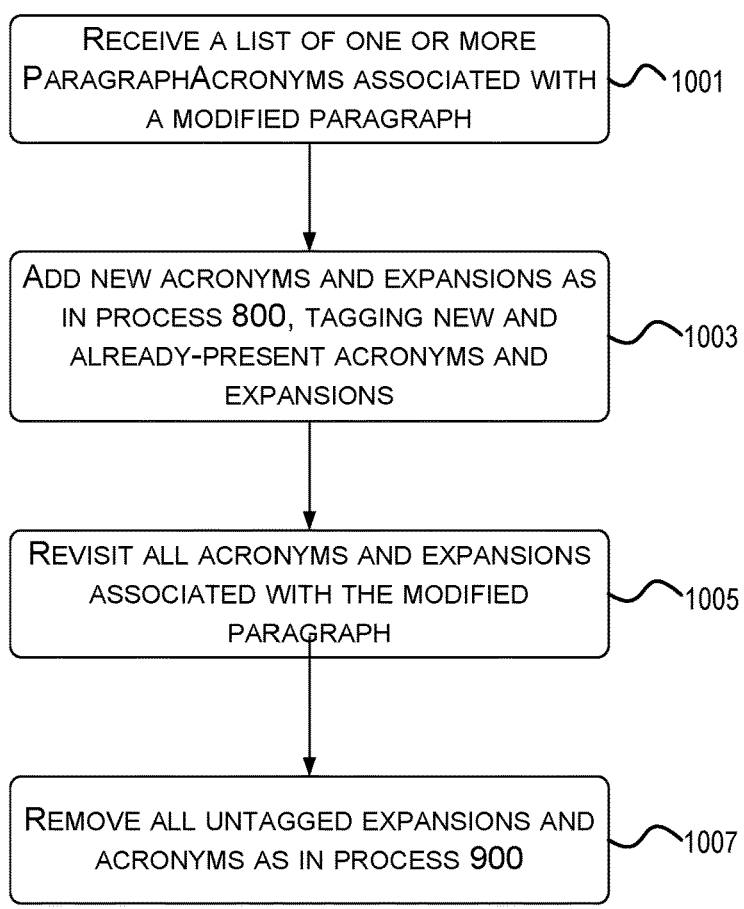
FIG. 10 is a flow diagram showing aspects of a routine for updating a task pane displaying acronyms based on an updated section of content.

FIG. 10 is a flow diagram showing aspects of a routine 1000 for updating a task pane displaying acronyms based on a recently updated section of content.

Flow diagram 1000 begins at operation 1001, where a list of one or more ParagraphAcronym objects associated with a modified section of content are received. As discussed above in conjunction with FIG. 6, ParagraphAcronyms may be received from an acronym processing service.

At operation 1003, expansions indicated in the ParagraphAcronyms object are inserted into AcronymDataStore 702 as described above in routine 800. These expansions represent acronyms still contained within the modified section of content (i.e. after the modification has occurred). In addition to the operations performed in routine 800, all newly added ExpansionWrapper objects are tagged. Already-present ExpansionWrapper objects encountered while processing routine 800 are also tagged. In one embodiment tagging an ExpansionWrapper object includes adding a reference to the ExpansionWrapper object to a list of visited ExpansionWrapper objects.

At operation 1005, all ExpansionWrapper objects associated with the modified section of content are revisited. In one embodiment, AcronymDataStore revisits these ExpansionWrapper objects as described above in conjunction with operations 901-907 of FIG. 9.

At operation 1007, the AcronymDataStore is queried to retrieve all untagged ExtensionWrapper objects 722, which are removed as discussed above in conjunction with FIG. 9. Specifically, each untagged ExpansionWrapper is processed as ExpansionWrappers were processed by operations 909-919.

FIG. 11 shows additional details of an example computer architecture 1100 for a computer, such as the computing device 102 (FIG. 1), capable of executing the program components described herein. Thus, the computer architecture 1100 illustrated in FIG. 11 illustrates an architecture for a server computer, a mobile phone, a PDA, a smart phone, a desktop computer, a netbook computer, a tablet computer, and/or a laptop computer. The computer architecture 1100 may be utilized to execute any aspects of the software components presented herein.

The computer architecture 1100 illustrated in FIG. 11 includes a central processing unit 1102 ("CPU"), a system memory 1104, including a random access memory 1106 ("RAM") and a read-only memory ("ROM") 1108, and a system bus 1110 that couples the memory 1104 to the CPU 1102. A basic input/output system containing the basic routines that help to transfer information between elements within the computer architecture 1100, such as during startup, is stored in the ROM 1108. The computer architecture 1100 further includes a mass storage device 1112 for storing an operating system 1107, other data, and one or more application program 100.

The mass storage device 1112 is connected to the CPU 1102 through a mass storage controller (not shown) connected to the bus 1110. The mass storage device 1112 and its associated computer-readable media provide non-volatile storage for the computer architecture 1100. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1100. For purposes of the claims, the phrase "computer storage medium," "computer-readable storage medium" and variations thereof, does not include waves, signals, and/or other transitory and/or intangible communication media, per se.

According to various configurations, the computer architecture 1100 may operate in a networked environment using logical connections to remote computers through the network 1156 and/or another network (not shown). The computer architecture 1100 may connect to the network 1156 through a network interface unit 1114 connected to the bus 1110. It should be appreciated that the network interface unit 1114 also may be utilized to connect to other types of networks and remote computer systems. The computer architecture 1100 also may include an input/output controller 1116 for receiving and processing input from a number of other devices, including a keyboard, mouse, or electronic stylus (not shown in FIG. 11). Similarly, the input/output controller 1116 may provide output to a display screen, a printer, or other type of output device (also not shown in FIG. 11).

It should be appreciated that the software components described herein may, when loaded into the CPU 1102 and executed, transform the CPU 1102 and the overall computer architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1100 in order to store and execute the software components presented herein. It also should be appreciated that the computer architecture 1100 may include other types of computing devices, including hand-held computers, embedded computer systems, personal digital assistants, and other types of computing devices known to those skilled in the art. It is also contemplated that the computer architecture 1100 may not include all of the components shown in FIG. 11, may include other components that are not explicitly shown in FIG. 11, or may utilize an architecture completely different than that shown in FIG. 11

The disclosure presented herein also encompasses the subject matter set forth in the following examples.

Example A

A method for updating a first collection and a second collection of a data store associating identifiers and related data, the method comprising: receiving an identifier extracted from a modified section of a document; receiving a piece of data related to the identifier from a remote data store; associating, in the first collection, the identifier with the modified section of the document; associating, in the second collection, the identifier and the piece of related data with the modified section of the document; tagging the piece of related data as existing in the modified section; querying the first collection and the second collection to determine an untagged piece of related data associated with the modified section and to determine when the untagged piece of related data is not associated with other sections of the document; in response to determining when the untagged piece of related data is not associated with other sections of the document, removing the untagged piece of related data from the second collection, wherein the untagged piece of related data is associated with an additional identifier; querying the second collection to determine when the additional identifier is not associated with any other pieces of related data; in response to determining when the additional identifier is not associated with any other pieces of related data, removing the additional identifier from the first collection and the second collection; updating an identifier pane based on updates to the second collection.

Example B

The method of example A, further including: associating a context data with the piece of related data indicating where in a collection of documents the piece of related data was defined.

Example C

The method of example B, wherein the context data indicates a type of document where the piece of related data was defined.

Example D

The method of example B, wherein the context data indicates an author of the document in which the piece of related data was defined.

Example E

The method of example B, wherein the context data includes a portion of the document the piece of related data was defined in.

Example F

The method of example E, further comprising: displaying, in the identifier pane, an indication of a type of document in which the piece of related data was defined; and in response to a user activation of the context data, displaying a portion of the document in which the piece of related data was defined.

Example G

A method for updating a first collection and a second collection of a data store associating identifiers and related pieces of data, the method comprising: receiving an identifier extracted from a new section of a document; receiving a piece of data related to the identifier from a remote data store; associating, in the first collection, the identifier with the new section of the document; associating, in the second collection, the identifier and the related piece of data with the new section of the document; and updating an identifier pane based on updated second collection.

Example H

The computing device of example G, wherein the identifier is extracted from an updated section of the document.

Example I

The computing device of example G, wherein identifiers in the identifier pane are sorted based on an alphabetical order or a frequency of occurrence of the identifier.

Example J

The computing device of example G, wherein identifiers in the identifier pane are prioritized based on which identifiers are visible in an authoring pane.

Example K

The computing device of example G, wherein the identifier includes an acronym and the related piece of data includes an expansion, wherein the first collection includes a paragraph-to-list of acronyms map, and wherein the second collection includes an acronym-to-acronym expansions object map.

Example L

The computing device of example K, wherein an acronym expansions object includes an acronym, an expansion key-to-expansion object map and a source paragraph-to-list of expansions map, wherein a key of the expansion key-to-expansion object map includes an expansion string, and wherein an expansion object includes context data and a set of paragraphs the expansion occurs in.

Example M

The computing device of example L, wherein associating, in the second collection, the acronym and the expansion with the new section of the document, includes: inserting a section of document ID and a list of acronyms extracted from the new section of the document into the paragraph-to-list of acronyms map; when an acronym expansions object does not exist for the received acronym and the received expansion, generating an acronym expansions object and inserting it into the acronyms-to-acronym expansions map; when the acronym expansions object does exist for the received acronym and the received expansion, updating the acronym expansion object to include the new section of the document and inserting it into the acronyms-to-acronym expansions map.

Example N

The computing device of example G, wherein the section of the document includes a word, a phrase, a sentence, a paragraph, a column, or a page.

Example O

A method for updating a first collection and a second collection of a data store associating identifiers and related pieces of data, the method comprising: detecting a deletion of a section of a document; identifying an identifier in the deleted section of the document; querying the first collection and the second collection to determine when a related piece of data associated with the identifier is not associated with instances of the identifier in other sections of the document; in response to determining when the related piece of data is not associated with instances of the identifier in other sections of the document, removing the related piece of data from the second collection; querying the data store to determine when the identifier is not associated with any other related pieces of data; in response to determining when the identifier is not associated with any other related pieces of data, removing the identifier from the first collection and the second collection; updating an identifier pane based on removals from the second collection.

Example P

The method of example O, wherein the method is performed in response to detecting an update to the section of the document.

Example Q

The method of example O, wherein the identifier includes an acronym and the related piece of data includes an expansion.

Example R

The method of example O, wherein the data store determines when the related piece of data associated with the identifier is not associated with instances of the identifier in other sections of content of the document based on a set of section of content identifiers associated with the related piece of data being empty.

Example S

The method of example O, wherein the data store determines when the identifier is not associated with any other related pieces of data based on an identifiers to related pieces of data map being empty for the identifier.

Example T

The method of example O, wherein removing the identifier from the data store includes removing a corresponding entry from an identifiers to related pieces of data mapping and removing a corresponding entry from a sections of the document to identifiers mapping.

Example AA

A method for updating a data store associating acronyms and expansions extracted from a document being edited and displayed in an authoring pane of an application, wherein the application concurrently displays an acronym pane displaying the acronyms and one or more associated expansions, the method comprising: detecting a modification of an existing section of content of the document; receiving a first acronym extracted from the new section of content; receiving an associated expansion of the first acronym from a remote data store; associating the first acronym with the section of content in the data store; associating the expansion with the section of content into the data store; tagging the expansion as existing after the modification; querying the data store to determine an untagged expansion of a second acronym associated with the deleted paragraph; querying the data store to determine when the untagged expansion is not associated with instances of the second acronym in other sections of the document; in response to determining when the untagged expansion is not associated with instances of the second acronym in other sections of the document, removing the untagged expansion from the data store; query the data store to determine when the second acronym is not associated with any other expansions; in response to determining when the second acronym is not associated with any other expansions, removing the second acronym from the data store; updating the acronym pane based on updates to the data store.

Example AB

The method of example AA, further including: associating a context data with the expansion indicating where in a collection of documents the expansion was defined.

Example AC

The method of Example AB, wherein the context data indicates a type of document where the expansion was defined.

Example AD

The method of Example AB, wherein the context data indicates an author of the document in which the expansion was defined.

Example AE

The method of Example AB, wherein the context data includes a portion of the document the expansion was defined in.

Example AF

The method of Example AE, further comprising: displaying, in the acronym pane, an indication of a type of document in which the expansion was defined; and in response to a user activation of the context data, displaying a portion of the document in which the expansion was defined.

Example AG

A method for updating a data store associating acronyms and expansions extracted from a document being edited and displayed in an authoring pane of an application, wherein the application concurrently displays an acronym pane displaying the acronyms and one or more associated expansions, the method comprising: detecting an addition of a new section of content added to the document; receiving an acronym extracted from the new section of content; receiving an associated expansion of the acronym from a remote data store; associating the acronym with the section of content in the data store; associating the expansion with the section of content into the data store; updating the acronym pane based on with the updated data store.

Example AH

The computing device of Example AG, wherein acronyms in the acronym pane are sorted in alphabetical order.

Example AI

The computing device of Example AG, wherein acronyms in the acronym pane are sorted based on a frequency of occurrence of the acronym.

Example AJ

The computing device of Example AG, wherein acronyms in the acronym pane are prioritized based on which acronyms are visible in the authoring pane.

Example AK

The computing device of Example AG, wherein the acronym pane displays acronyms based on a key of an acronym-to-expansions mapping.

Example AL

The computing device of Example AG, wherein the acronym pane displays expansions based on an expansion-key-to-expansionobject mapping, wherein a key to the expansionkey-to-expansionobject mapping is based on a value of the acronym-to-expansions mapping.

Example AM

The computing device of claim 7, wherein the acronym-to-expansions mapping is implemented with a HashMap.

Example AN

The computing device of claim 7, wherein the section of content includes a word, a phrase, a sentence, a paragraph, a column, or a page.

Example AO

A method for updating a data store associating acronyms and expansions extracted from a document being edited and displayed in an authoring pane of an application, wherein the application concurrently displays an acronym pane displaying the acronyms and one or more associated expansions, the method comprising: detecting a deletion of a section of content of the document; identifying an acronym in the deleted section of content; querying the data store to determine when an expansion associated with the acronym is not associated with instances of the acronym in other sections of the document; in response to determining when the expan-sion is not associated with instances of the acronym in other sections of the document, removing the expansion from the data store; querying the data store to determine when the acronym is not associated with any other expansions; in response to determining when the acronym is not associated with any other expansions, removing the acronym from the data store; updating the acronym pane based on removals from the data store.

Example AP

The method of Example AO, wherein the acronym pane is updated to remove the expansion or the acronym.

Example AQ

The method of Example AO, wherein the acronym includes a word and the expansion includes a definition.

Example AR

The method of Example AO, wherein the data store determines when the expansion associated with the acronym is not associated with instances of the acronym in other sections of the document based on a set of section of content identifiers associated with the expansion being empty.

Example AS

The method of Example AO, wherein the data store determines when the acronym is not associated with any other expansions based on an acronyms to expansions map being empty for the acronym.

Example AT

The method of Example AO, wherein removing the acronym from the data store includes removing a corresponding entry from an acronyms to expansions mapping and removing a corresponding entry from a paragraphs to acronyms mapping.

Example BA

BA method for updating a list of acronyms and expansions displayed in a task pane in response to a paragraph being added to a live document, wherein the list of acronyms is represented in a data store by a paragraph-acronyms map of paragraphIds to lists of acronym strings and an acronym-to-expansions map of acronym strings to lists of acronym:expansion objects, wherein each acronym:expansion object includes a paragraph-to-expansions map of paragraphIds to lists of expansion strings and an expansion key-to-expansion object map of expansion strings to expansion objects, wherein expansion objects include expansion context data and an expansion-paragraphs set indicating which paragraphs the expansion has been found in, comprising: receiving an acronym and associated expansion identified within the added paragraph; adding a paragraphId of the added paragraph and the received acronym to the paragraph-to-acronyms map; adding a mapping between the acronym and an acronym:expansion pair object to the acronym-to-expansions map; for the added acronym:expansion pair object: adding a mapping between the paragraphId and the expansion to the paragraph-to-expansions map; adding a mapping between the expansion and an expansion object to the expansion key-to-expansion object map; for the added expansion object, adding the paragraphId to the expansion-paragraphs set; and updating the task pane with the updated acronym-expansions map.

Example BB

The method of example BA, wherein the expansion context data includes an indication of where the expansion was defined.

Example BC

The method of example BA, wherein the acronyms and expansions are displayed by enumerating the acronym-to-expansions map, wherein each key of the acronym-to-expansions map, an acronym string, is displayed as an acronym, and wherein each value, a list of acronym:expansion objects, is enumerated to display the expansions.

Example BD

The method of example BA, wherein, when a mapping in the acronyms-to-an acronym:expansion object does not already exist for the received acronym, such that the received acronym is not already associated with the document, generating a new acronym:expansion object and adding an acronym to acronym:expansion object list mapping to the acronym-to-expansions mapping;

Example BE

The method of example BA, wherein, when a mapping in the acronyms-to-an acronym:expansion object already exists for the received acronym, but an acronym:expansion object for does not already exist for the received expansion, adding an acronym:expansion object to the list of acronym:expansion objects mapped to the received acronym.

Example BF

The method of example BA, wherein the method for updating the list of acronyms and expansions displayed in the task pane is in response to the paragraph being modified, the method further comprising: tagging each expansion object that was generated or would have been generated if it didn't already exist; traversing each expansion object associated with the paragraph, and removing untagged expansion objects.

Example BG

A computing device for updating a list of acronyms and expansions displayed in a task pane in response to a paragraph being deleted from a live document, wherein the list of acronyms is represented in a data store by a paragraph-acronyms map of paragraphIds to lists of acronym strings and an acronym-to-expansions map of acronym strings to lists of acronym:expansion objects, wherein each acronym:expansion object includes a paragraph-to-expansions map of paragraphIds to lists of expansion strings and an expansion-key-to-expansionobject map of expansion strings to expansion objects, wherein expansion objects include expansion context data and an expansion-paragraphs set indicating which paragraphs the expansion has been found in, the computing device comprising: one or more processors; a memory in communication with the one or more processors, the memory having computer-readable instructions stored thereupon which, when executed by the one or more processors, cause the computing device to: determine all acronyms found in the deleted paragraph from the paragraph-to-acronyms map; determine all acronym:expansion objects associated with the determined acronyms from the acronym-to-expansions map; for each determined acronym:expansion object: determine all expansion strings associated with the received paragraph from the paragraph-to-expansions map, and determine the corresponding expansion objects from the expansionkey-to-expansionobject map; for each of the determined expansion objects: remove a paragraphId associated with the deleted paragraph from the expansion-paragraphs set; when the expansion-paragraphs set is empty, remove the expansion object from the determined expansion object's expansionkey-to-expansionobject map, remove the expansion from the acronym:expansion object's paragraph-to-expansions map, and remove the corresponding acronym:expansion element from the list of acronym:expansion objects associated with the received acronym in the acronym-to-expansions map, as this expansion no longer appears in the document; and updating the task pane with the updated acronym-expansions map.

Example BH

The computing device of example BG, wherein when the acronym:expansion object list for the received acronym is empty, remove the acronym from the acronym-to-expansions mapping, as the acronym no longer appears in the document.

Example BI

The computing device of example BG, wherein the expansion context data includes an indication that the expansion was defined in one of an email or a document.

Example BJ

The computing device of example BG, wherein the task pane displays, for one or more of the expansions, a source document type from which the expansion was defined, based on the context data.

Example BK

The computing device of example BJ, wherein the task pane displays a user interface element associated with the source document type that, when activated by a user, causes the source document to be displayed.

Example BL

The computing device of example BJ, wherein the method for updating the list of acronyms and expansions displayed in the task pane is in response to the paragraph being modified, the method further comprising: inserting acronyms and expansions found in the modified paragraph into the data store; tagging each expansion object that was, during the inserting, generated or would have been generated if it didn't already exist; and skipping the removal of tagged expansion objects.

Example BM

The computing device of example BG, wherein the task pane is bound to the acronyms-to-expansions map to display acronyms and their expansions, and wherein the task pane is bound to the expansionkey-to-expansionobject map to display context information related to the one or more of the expansions.

Example BN

The computing device of example BG, wherein acronyms and expansions are identified in a paragraph by an acronym processing service.

Example BO

A method for updating a list of acronyms and expansions displayed in a task pane in response to a paragraph being modified in a live document, wherein the list of acronyms is represented in a data store by a paragraph-acronyms map of paragraphIds to lists of acronym strings and an acronym-to-expansions map of acronym strings to lists of acronym:expansion objects, wherein each acronym:expansion object includes a paragraph-to-expansions map of paragraphIds to lists of expansion strings and an expansionkey-to-expansionobject map of expansion strings to expansion objects, wherein expansion objects include expansion context data and an expansion-paragraphs set indicating which paragraphs the expansion has been found in, comprising: for each of one or more received acronyms and corresponding expansions identified within the modified paragraph: adding a paragraphId of the added paragraph and the received acronym to the paragraph-to-acronyms map; adding a mapping between the acronym and an acronym:expansion pair object to the acronym-to-expansions map; for the added acronym:expansion pair object: adding a mapping between the paragraphId and the expansion to the paragraph-to-expansions map; adding a mapping between the expansion and an expansion object to the expansionkey-to-expansionobject map; tagging the added expansion object; when a mapping already exists between the expansion and the expansion object in the expansionkey-to-expansionobject map, tagging the existing expansion object; for the added expansion object, adding the paragraphId to the expansion-paragraphs set; for each of the tagged expansion objects: remove a paragraphId associated with the modified paragraph from the expansion-paragraphs set; when the expansion-paragraphs set is empty, remove the expansion object from the tagged expansion object's expansionkey-to-expansionobject map, remove the expansion from the acronym:expansion object's paragraph-to-expansions map, and remove the corresponding acronym:expansion element from the list of acronym:expansion objects associated with the received acronym in the acronym-to-expansions map, as this expansion no longer appears in the document; and updating the task pane with the updated acronym-expansions map.

Example BP

The method of example BO, wherein the expansion context data includes an indication of where the expansion was defined.

Example BQ

The method of example BO, wherein the acronyms and expansions are displayed by enumerating the acronym-to-expansions map, wherein each key of the acronym-to-expansions map, an acronym string, is displayed as an acronym, and wherein each value, a list of acronym:expansion objects, is enumerated to display the expansions.

Example BR

The method of example BO, wherein, when a mapping in the acronyms-to-an acronym:expansion object does not already exist for the received acronym, such that the received acronym is not already associated with the document, generating a new acronym:expansion object and adding an acronym to acronym:expansion object list mapping to the acronym-to-expansions mapping;

Example BS

The method of example BO, wherein, when a mapping in the acronyms-to-an acronym:expansion object already exists for the received acronym, but an acronym:expansion object for does not already exist for the received expansion, adding an acronym:expansion object to the list of acronym:expansion objects mapped to the received acronym.

Example BT

The method of example BO, wherein the task pane displays a user interface element associated with the source document type that, when activated by a user, causes the source document to be displayed.

The invention claimed is:

1. A method for updating a first collection and a second collection of a data store associating identifiers and related data, the method comprising:
   receiving an identifier extracted from a modified section of a document;
   receiving a piece of data related to the identifier from a remote data store;
   associating the identifier in the modified section of the document with the piece of related data by:
      associating, in the first collection, the identifier with the modified section of the document;
      associating, in the second collection, the identifier and the piece of related data with the modified section of the document;
   querying the first collection and the second collection to identify an untagged piece of related data associated with an additional identifier located in the modified section, and querying the first collection and the second collection to determine if the untagged piece of related data is not associated with other sections of the document;
   in response to determining the untagged piece of related data is not associated with other sections of the document, removing the untagged piece of related data from the second collection;
   querying the second collection to determine if the additional identifier is not associated with any other pieces of related data;
   in response to determining the additional identifier is not associated with any other pieces of related data, removing the additional identifier from the first collection and the second collection;
   updating an identifier pane based on updates to the second collection.

2. The method of claim 1, further including:
   associating a context data with the piece of related data indicating where in a collection of documents the piece of related data was defined.

3. The method of claim 2, wherein the context data indicates a type of document where the piece of related data was defined, an author of the document in which the piece of related data was defined, or a portion of the document the piece of related data was defined in.

4. The method of claim 3, further comprising:
displaying, in the identifier pane, an indication of a type of document in which the piece of related data was defined; and
in response to a user activation of the context data, displaying a portion of the document in which the piece of related data was defined.

5. The method of claim 1, wherein the modified section of the document is modified by a user editing the modified section of the document, wherein the identifier extracted from the modified section of the document is an acronym, and wherein the piece of data related to the identifier is an expansion of the acronym.

6. The method of claim 1, wherein the identifier is an instance of an acronym added to the modified section of the document, and wherein the additional identifier is an instance of a different acronym that was removed from the modified section of the document.

7. A method for updating a first collection and a second collection of a data store associating identifiers and related pieces of data, the method comprising:
receiving an identifier extracted from a new section of a document;
receiving a piece of data related to the identifier from a remote data store;
associating, in the first collection, the identifier with the new section of the document;
associating, in the second collection, the identifier and the related piece of data with the new section of the document; and
updating an identifier pane based on updated second collection.

8. The method of claim 7, wherein the identifier is extracted from an updated section of the document.

9. The method of claim 7, wherein identifiers in the identifier pane are sorted based on an alphabetical order or a frequency of occurrence of the identifier.

10. The method of claim 7, wherein identifiers in the identifier pane are prioritized based on which identifiers are visible in an authoring pane.

11. The method of claim 7, wherein the identifier includes an acronym and the related piece of data includes an expansion, wherein the first collection includes a paragraph-to-list of acronyms map, and wherein the second collection includes an acronym-to-acronym expansions object map.

12. The method of claim 11, wherein an acronym expansions object includes an acronym, an expansion key-to-expansion object map and a source paragraph-to-list of expansions map, wherein a key of the expansion key-to-expansion object map includes an expansion string, and wherein an expansion object includes context data and a set of paragraphs the expansion occurs in.

13. The method of claim 12, wherein associating, in the second collection, the acronym and the expansion with the new section of the document, includes:
inserting a section of document ID and a list of acronyms extracted from the new section of the document into the paragraph-to-list of acronyms map;
when an acronym expansions object does not exist for the received acronym and the received expansion, generating an acronym expansions object and inserting it into the acronyms-to-acronym expansions map;
when the acronym expansions object does exist for the received acronym and the received expansion, updating the acronym expansion object to include the new section of the document and inserting it into the acronyms-to-acronym expansions map.

14. The method of claim 7, wherein the section of the document includes a word, a phrase, a sentence, a paragraph, a column, or a page.

15. A method for updating a first collection and a second collection of a data store associating identifiers and related pieces of data, the method comprising:
detecting a deletion of a section of a document;
identifying an identifier in the deleted section of the document;
querying the first collection and the second collection to determine if a related piece of data associated with the identifier is not associated with instances of the identifier in other sections of the document;
in response to determining the related piece of data is not associated with instances of the identifier in other sections of the document, removing the related piece of data from the second collection;
querying the data store to determine if the identifier is not associated with any other related pieces of data;
in response to determining the identifier is not associated with any other related pieces of data, removing the identifier from the first collection and the second collection;
updating an identifier pane based on removals from the second collection.

16. The method of claim 15, wherein the method is performed in response to detecting an update to the section of the document.

17. The method of claim 15, wherein the identifier includes an acronym and the related piece of data includes an expansion.

18. The method of claim 15, wherein the data store determines when the related piece of data associated with the identifier is not associated with instances of the identifier in other sections of content of the document based on a set of section of content identifiers associated with the related piece of data being empty.

19. The method of claim 15, wherein the data store determines when the identifier is not associated with any other related pieces of data based on an identifiers to related pieces of data map being empty for the identifier.

20. The method of claim 15, wherein removing the identifier from the data store includes removing a corresponding entry from an identifiers to related pieces of data mapping and removing a corresponding entry from a sections of the document to identifiers mapping.

* * * * *